(12) United States Patent
Hoare et al.

(10) Patent No.: US 10,310,077 B2
(45) Date of Patent: Jun. 4, 2019

(54) SYSTEM FOR USE IN A VEHICLE (71) Applicant: Jaguar Land Rover Limited, Coventry, Warwickshire (GB)

(72) Inventors: Edward Hoare, Malvern (GB); Thuy-Yung Tran, Rugby (GB); Marina Gashinova, Birmingham (GB); Aleksandr Bystrov, Birmingham (GB); Mikhail Cherniakov, Birmingham (GB)

(73) Assignee: JAGUAR LAND ROVER LIMITED, Warwickshire (GB)

( * ) Notice: Subject to any disclaimer, the term of this patent is extended or adjusted under 35 U.S.C. 154(b) by 295 days.

(21) Appl. No.: 15/118,216

(22) PCT Filed: Feb. 3, 2015

(86) PCT No.: PCT/EP2015/052152
§ 371 (c)(1),
(2) Date: Aug. 11, 2016

(87) PCT Pub. No.: WO2015/121108
PCT Pub. Date: Aug. 20, 2015

(65) Prior Publication Data
US 2017/0168156 A1 Jun. 15, 2017

(30) Foreign Application Priority Data

Feb. 12, 2014 (GB) .................................. 1402389.9

(51) Int. Cl.
*G01S 13/93* (2006.01)
*G01S 13/87* (2006.01)
(Continued)

(52) U.S. Cl.
CPC ............ *G01S 13/931* (2013.01); *G01S 7/024* (2013.01); *G01S 7/411* (2013.01); *G01S 7/417* (2013.01);
(Continued)

(58) Field of Classification Search
CPC ............. B60W 40/064; B60W 40/068; B60W 2420/52; B60W 2420/54; G01B 15/08;
(Continued)

(56) References Cited

U.S. PATENT DOCUMENTS 4,148,027 A * 4/1979 Nowogrodzki ......... G01S 13/50
342/104
5,061,932 A * 10/1991 Tribe .................... G01S 13/931
342/70

(Continued)

FOREIGN PATENT DOCUMENTS

DE 19932094 A1 1/2001
DE 102006032735 A1 * 1/2008 ............. G01B 15/08
(Continued)

OTHER PUBLICATIONS

Kees et al., "Road surface classification by using a polarmetric coherent radar module at millimeter waves," Microwave Symposium Digest, IEEE MTT-S International San Diego, CA, p. 1675, May 23, 1994.
(Continued)

Primary Examiner — Bernarr E Gregory
(74) Attorney, Agent, or Firm — Miller Nash Graham & Dunn LLP (57) ABSTRACT

A system for use in a vehicle determining the type of terrain ahead of the vehicle, the system comprising; a processor configured to receive sensor output data from a plurality of vehicle-mounted sensors, including at least one radar sensor and at least one acoustic sensor, each for receiving a
(Continued)

reflected signal from the terrain ahead of the vehicle; and a data memory configured to store pre-determined data relating sensor output data, for the or each acoustic sensor and the or each radar sensor, to a terrain type; wherein the processor is configured to compare the sensor output data with the pre-determined data to determine an indication of the terrain type corresponding to the sensor output data.

20 Claims, 8 Drawing Sheets

(51) Int. Cl.
   *G01S 7/41* (2006.01)
   *G01S 7/02* (2006.01)
   *G01S 13/86* (2006.01)
   *G01S 13/00* (2006.01)
(52) U.S. Cl.
   CPC ............ *G01S 13/862* (2013.01); *G01S 13/87* (2013.01); *G01S 13/867* (2013.01)
(58) Field of Classification Search
   CPC ....... B60G 17/109; G01S 13/87; G01S 13/50; G01M 15/11
   See application file for complete search history.

(56) References Cited

U.S. PATENT DOCUMENTS

| | | | | |
|---|---|---|---|---|
| 5,163,319 A | * | 11/1992 | Spies et al. .......... | B60G 17/019 73/146 |
| 7,240,540 B2 | * | 7/2007 | Assaf .................... | G01M 15/11 73/105 |

FOREIGN PATENT DOCUMENTS

| | | | |
|---|---|---|---|
| DE | 102011003334 A1 | 8/2012 | |
| EP | 0470506 A2 | 2/1992 | |
| EP | 2548747 A1 | 1/2013 | |
| EP | 2574958 A1 | 4/2013 | |
| FR | 2971051 A1 * | 8/2012 | .......... B60W 40/064 |

OTHER PUBLICATIONS

International Search Report and Written Opinion for International Patent Application No. PCT/EP2015/052152, dated Jun. 5, 2015, 14 pages.

* cited by examiner

SYSTEM FOR USE IN A VEHICLE

CROSS-REFERENCE TO RELATED APPLICATIONS

This application is a 371 of International Application No. PCT/EP2015/052152, filed 3 Feb. 2015, which claims priority to GB Patent Application 1402389.9, filed 12 Feb. 2014, the contents of which are incorporated by reference herein in their entirety.

FIELD OF THE INVENTION

The present invention relates to a system for use in a vehicle and in particular to a system that enables a vehicle to determine an indication of the type of terrain ahead of the vehicle. Aspects of the invention relate to a vehicle system, a method for use in a vehicle, and to a vehicle itself.

BACKGROUND

Many modern vehicles are fitted with systems (anti-lock braking, adjustable ride height etc.) designed to improve the riding experience of the users. The riding experience could be a measure of, for example, comfort or vehicle composure, and the setup of the systems of a vehicle to optimise the riding experience may be dependent on the type of terrain over which the vehicle travels. Current systems with defined system settings for a plurality of different terrain types can be manually set to a terrain type by a user, or may use sensors to determine characteristics about the terrain over which a vehicle is travelling, and then select the most appropriate setting. However, the determination of a terrain type by examining vehicle parameters using on-board systems is a reactive solution to the terrain over which the vehicle is currently travelling and as such does not allow the vehicle to prepare in advance for the terrain over which it is about to travel without user-input.

One object of the present invention is to provide a system for use in a vehicle that is able to determine certain characteristics relating to the terrain ahead of a vehicle addressing the disadvantages of the systems in the prior art.

STATEMENTS OF INVENTION

According to an aspect of the present invention there is provided a system for use in a vehicle for determining an indication of the terrain type ahead of the vehicle, the system comprising a processor for receiving sensor output data from a plurality of vehicle-mounted sensors, including at least one radar sensor and at least one acoustic sensor, each for receiving a reflected signal from the terrain ahead of the vehicle. "Vehicle-mounted" may mean a portable device carried on the vehicle temporarily. The system further comprises a data memory for storing pre-determined data relating sensor output data for the or each acoustic sensor and the or each radar sensor to a particular terrain type. The processor includes means for comparing the sensor output data with the pre-determined data to determine an indication of the particular terrain type corresponding to the sensor output data.

The combination of sensor output data from both a radar sensor and an acoustic sensor can result in greater distinction between the characteristics of parameters relating to sensor output data for certain terrain types in which parameters relating to sensor output data are poorly distinguished by use of one type of sensor only. In addition, radar and acoustic sensors are not affected by different weather conditions.

The processor may be further configured to receive sensor output data from at least one optical sensor mounted on the vehicle and/or at least one infrared sensor mounted on the vehicle. The use of sensor output data from a greater number of different types of sensor may result in even greater distinction between the characteristics of parameters relating to certain terrain types, thus improving the accuracy of the determined indication of the particular terrain type to which the sensor output data corresponds.

In an embodiment, the system comprises a human machine interface (HMI) configured to enable communication of the determined terrain type to the user. The HMI may be further configured to enable user-input in relation to the terrain type following determination of the terrain type by the user.

The processor may be configured to receive the user-input in relation to the terrain type and, in dependence upon the user-input, to provide a terrain type to the data memory together with sensor output data corresponding to the terrain type to supplement the pre-determined data as part of a self-learning process. In addition, or alternatively, the processor may be configured to input the determined terrain type to the data memory together with parameters corresponding to the sensor output data to supplement the pre-determined data as part of a self-learning process.

The pre-determined data may therefore be added to and updated using real-time sensor output data, enhancing the prospect of the vehicle control system accurately determining an indication of the terrain type ahead of the vehicle in a subsequent determination loop.

In one embodiment, the processor is configured to receive sensor output data from the or each radar sensor in the form of a received horizontally polarised signal representative of power in a received horizontal polarisation component of a radar signal reflected from the terrain ahead of the vehicle. In addition, or alternatively, the processor may be configured to receive a vertically polarised signal representative of power in a received vertical polarisation component of a radar signal reflected from the terrain ahead of the vehicle. The processor may be further configured to determine a horizontal (or vertical) polarisation power signal, that is the power of the received horizontally (or vertically) polarised signal from a horizontally (or vertically) polarised transmitter. The processor may also be configured to determine a cross polarisation power signal, that is the power of the received horizontally polarised signal from the vertically polarised transmitter (or power of the received vertically polarised signal from the horizontally polarised transmitter).

In one embodiment, the processor is configured to receive sensor output data from the or each radar sensor in the form of a received elliptically polarised signal, optionally a received circularly polarised signal. The processor may be further configured to determine a cross polarisation power signal, that is the power of a received clockwise-rotating elliptically polarised signal from a transmitted anticlockwise-rotating elliptically polarised signal, or the power of a received anticlockwise-rotating elliptically polarised signal from a transmitted clockwise-rotating elliptically polarised signal. There are certain types of terrain which are particularly sensitive to elliptically polarised signals and so this may prove to be a useful parameter when determining certain terrain types. Note from above that "cross polarisation" may refer to either the received horizontal (or vertical) signal from the transmitted vertical (or horizontal) signal or the received clockwise- (or anticlockwise-) rotating signal from the transmitted anticlockwise- (or clockwise-) rotating signal.

In one embodiment, the processor is configured to determine the ratio of any two of the horizontal polarisation power signal, the vertical polarisation power signal, and the cross polarisation power signal. Use of the relative values obtained by determining the abovementioned ratios is advantageous over the use of absolute values of the parameters since relative values depend to a lesser extent on the signal power from a transmitter and also the distance from the transmitter to the target terrain, i.e. they are less dependent upon signal attenuation.

In one embodiment, the processor is configured to compare one or more of the determined ratios with a corresponding pre-determined ratio for a plurality of different terrain types, and is configured to determine an indication of the terrain type on the basis of the comparison.

In one embodiment, the processor is configured to receive sensor output data from the or each acoustic sensor in the form of an acoustic power signal representative of power in an acoustic signal reflected from the terrain ahead of the vehicle. The processor may be further configured to determine a ratio of the acoustic power signal with one or more of the horizontal polarisation power signal, the vertical polarisation power signal, and the cross polarisation power signal. The processor may then compare the determined ratio with a corresponding pre-determined ratio for a plurality of different terrain types, and determine an indication of the terrain type on the basis of the comparison.

The processor may be configured to analyse parameters relating to sensor output data using a mathematical technique. For example, the processor may be configured to analyse the sensor output data by clustering the sensor output data into a plurality of clusters, where each cluster corresponds to a different terrain type. In one embodiment, the processor is configured to use a 'k-means' algorithm to analyse the data or, alternatively, the processor may be configured to use a 'k-nearest neighbour' algorithm to analyse the data.

The values of parameters relating to sensor output data for a given terrain type can be significantly different between measurements; however, the use of a clustering algorithm allows certain characteristics common to each measurement for a given terrain to be extracted from the sensor output data.

In one embodiment the processor is configured to determine to which one of the clusters the sensor output data belongs so as to determine an indication of the terrain type. For example, the processor may be configured to use a Euclidean algorithm to determine to which one of the clusters the sensor output data belongs.

The system may, but need not, include the transmitters of the acoustic and radar signals themselves. For example, the vehicle system may include at least one acoustic transmitter for transmitting an acoustic signal to the terrain ahead and at least one acoustic sensor for sensing a reflected signal of the acoustic signal from the terrain ahead, and at least one radar transmitter for transmitting a radar signal to the terrain ahead and at least one radar sensor for sensing a reflected signal of the radar signal from the terrain ahead. The acoustic transmitter and the acoustic sensor may form part of a single unit. Likewise, the radar transmitter and the radar sensor may form part of a single unit.

The system may comprise means configured to transmit radar signals at orthogonal horizontal and vertical polarisations, and may further comprise means configured to transmit radar signals with a circular or elliptical polarisation. In addition, the system may comprise means configured to transmit radar signals at two or more frequencies.

In another embodiment, the system includes means configured to control at least one vehicle subsystem in dependence on the determination of the terrain type.

According to another aspect of the invention, there is provided a method for implementing the vehicle system capabilities described above to enable the vehicle system to determine an indication of the terrain type ahead of the vehicle.

In a further embodiment, there is provided a data memory containing a computer readable code for performing the method described above.

In another aspect of the invention there is provided a vehicle controller for determining an indication of the type of terrain ahead of the vehicle, the controller comprising; a processor having an input to receive sensor output data from a plurality of vehicle-mounted sensors, including at least one radar sensor and at least one acoustic sensor, each vehicle-mounted sensor for receiving a reflected signal from the terrain ahead of the vehicle; and memory having stored thereon pre-determined data relating sensor output data for the or each acoustic sensor and the or each radar sensor to a particular terrain type; wherein the processor compares the sensor output data with the stored pre-determined data to determine an indication of the particular terrain type corresponding to the sensor output data.

The controller described herein can comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device.

According to another aspect of the invention, there is provided a vehicle comprising a vehicle control system as described above, or a controller as described above, at least one radar sensor, and at least one acoustic sensor.

In one embodiment, the present invention has the advantage of simply requiring existing systems on a vehicle to be modified (for example, parking assistance and ACC systems), and so does not incur additional cost to the user and does not require extra equipment that may add extra weight or take up more space in a vehicle. Alternatively, dedicated radar or acoustic sensors (e.g. transmitter/receiver pairs or transceivers) may be used.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, except where such features are incompatible.

BRIEF DESCRIPTION OF DRAWINGS

The invention will now be described, by way of example only, with reference to the accompanying figures in which.

DETAILED DESCRIPTION

In the present invention, data relating to the terrain ahead of a vehicle is collected from a plurality of different types of sensors on a vehicle for a plurality of different parameters.

Figure 1:
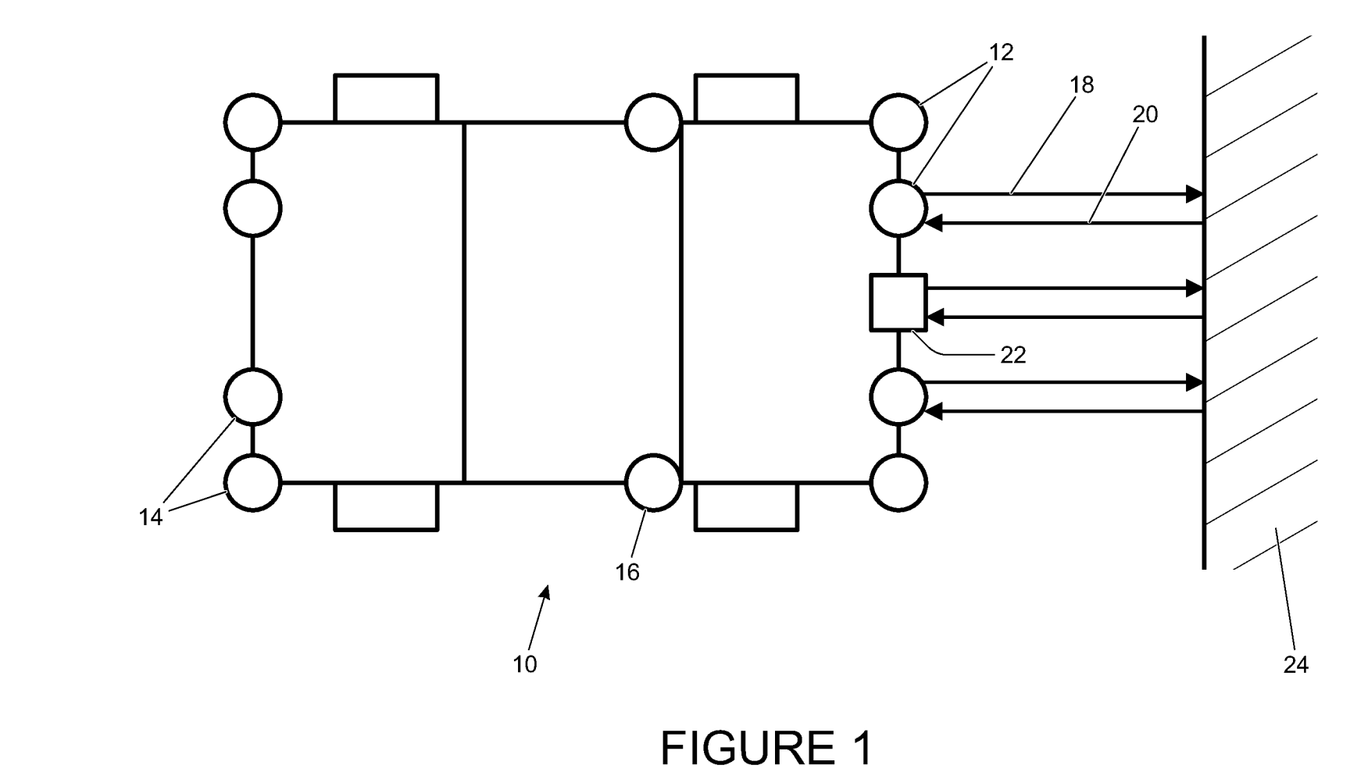
FIG. 1 is an overhead view of a vehicle and of terrain ahead of the vehicle.

FIG. 1 shows one embodiment of a vehicle 10 with two different types of sensors that collect data to be input to different systems of the vehicle. In current systems, there may be acoustic sensors positioned at the front 12, rear 14 and/or side 16 of the vehicle: commonly, acoustic sensors are used to send and receive acoustic signals to collect sensor output data to be input to, for example, parking assistance systems of the vehicle. The acoustic sensors may be ultrasound sensors.

Typically, parking assistance systems are used to warn a vehicle user, either by visual or audible means, of the vehicle's proximity to an obstacle. In the case of an audible warning, a warning tone may sound with increasing frequency as the obstacle becomes closer to the vehicle. The acoustic sensors used for parking assistance systems are typically able to detect obstacles at short-range (0.25-1.5 meters) but at a wide angle from the direction in which the sensor is pointed. The parking assistance system may transmit acoustic pulses 18 and then receive back any reflected signal 20 from an obstacle, which may then be processed to calculate the distance between the vehicle and the obstacle.

Also in current systems, there may be a radar sensor 22 positioned at the front of the vehicle 10: commonly, radar sensors are used to send and receive radar signals to collect sensor output data to be input to, for example, adaptive cruise control (ACC) systems. In an ACC system, the time between a radar signal being sent and then received back is measured, and then the time interval to a vehicle in front is calculated. This information is sent to other systems of the vehicle (throttle control, brake control etc.) and the necessary action is taken to maintain a constant time interval to the vehicle in front. The radar sensors in an ACC system are typically able to detect an obstacle up to about 150 meters in front of the vehicle but at a narrow angle from the direction in which the sensor is pointed; other ACC systems may use shorter range, wider angle radars, or a combination of both.

Radar sensors may be positioned at other locations on the vehicle to collect sensor output data to be input to, for example, blind spot detection (BSD) systems, lane departure warning systems, or speed-gun detector systems (none of which are shown). FIG. 1 also shows the terrain 24 ahead of the vehicle.

Figure 2:
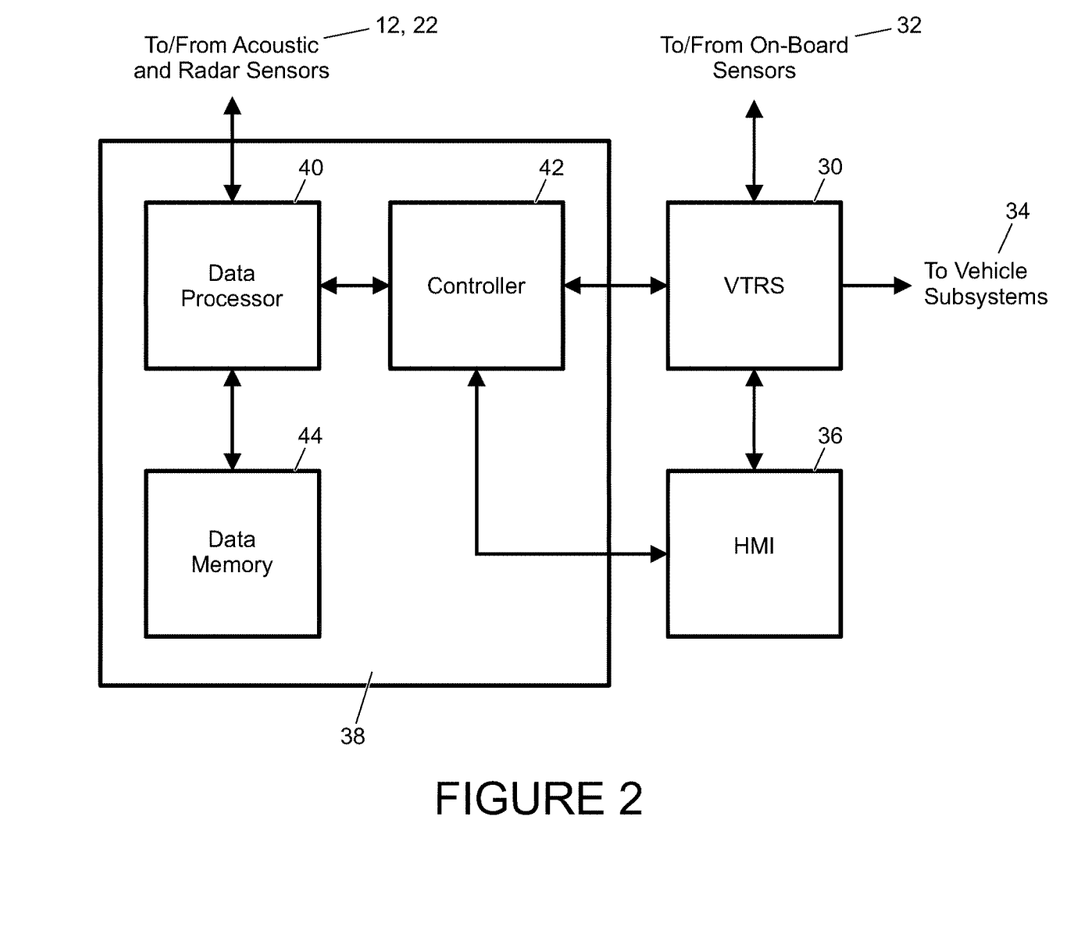
FIG. 2 is a diagram showing the component parts of a vehicle control system (VCS), together with the inputs to, and outputs from, the VCS.

Referring to FIG. 2, in some current vehicles a vehicle system is configured to improve the riding experience of the vehicle user; for example, a vehicle control system (VCS) in the form of a vehicle terrain response system (VTRS) 30, such as a Terrain Response® system, receives sensor output data from one or more on-board sensors 32 (such as a wheel speed sensor, tyre pressure sensor, vehicle speed sensor, brake pedal position sensor, suspension articulation, acceleration, wheel slip, pitch rate, and yaw rate) relating to the terrain over which the vehicle 10 is currently travelling, processes the data, and sends control signals via a controller to one or more subsystems 34 (such as a suspension system, traction-control system, stability-control system, engine torque system, or ride height system) so as to allow adjustment of the setup of the vehicle 10 accordingly. The controller also communicates with a human machine interface (HMI) 36 which incorporates a display. Via the HMI display, the user receives alerts or advice, relating to a host of vehicle systems, for example, satellite navigation or in-vehicle entertainment systems. The HMI 36 typically includes a touch-screen keyboard, dial, or voice activation to enable user selection of a particular input for the various vehicle systems which can be controlled.

In a vehicle incorporating the VTRS 30, in response to a user-input via the HMI 36, a control signal is sent via a controller of the VTRS 30 to the one or more vehicle subsystems 34 to adjust the vehicle setup, according to the terrain type over which the vehicle is travelling. Alternatively, the VTRS 30 may adjust the vehicle setup automatically by sending a control signal to the vehicle subsystems 34 in response to the on-board sensor output data 32. The VTRS 30 may also send alerts to the vehicle user, via the HMI 36, to adjust his/her driving style (for example, to reduce the vehicle speed), according to the terrain type over which the vehicle is travelling. Details of how the setup may be adjusted via the VTRS 30 are described in UK patent application GB2492655.

In one embodiment of the present invention, a separate VCS 38 includes: a data processor 40 that receives sensor output data from the acoustic and radar sensors 12, 22; a VCS controller 42 for sending and receiving signals from the HMI 36 and/or VTRS 30; and a data memory 44 for storing acoustic and radar sensor output data.

The VCS 38 determines an indication of the terrain type ahead of the vehicle 10 using sensor output data that is collected in real-time for a plurality of different parameters relating to characteristics of the target terrain from the acoustic and radar sensors 12, 22. The VCS controller 42 will then send a control signal to either the VTRS 30 to adjust the vehicle setup accordingly, or the HMI 36 to prompt the user to input the determined terrain type to the VTRS 30. Here and throughout, the term "determine" should be interpreted to mean "makes a best estimation of".

In more detail, the data processor 40 of the VCS 38 receives sensor output data from both the acoustic and radar sensors 12, 22. The data processor 40 is responsible for associating the received sensor output data to a particular terrain type which it does by retrieving pre-determined information from the data memory 44 for comparison with the sensor output data. Upon determination of the terrain, the data processor 40 communicates with the VCS controller 42, which is responsible for sending control signals to the HMI 36 relating to the determined terrain type. It will be appreciated that, although the processor 40 and controller 42 are shown as independent components, they may comprise a single electronic controller.

Figure 3:
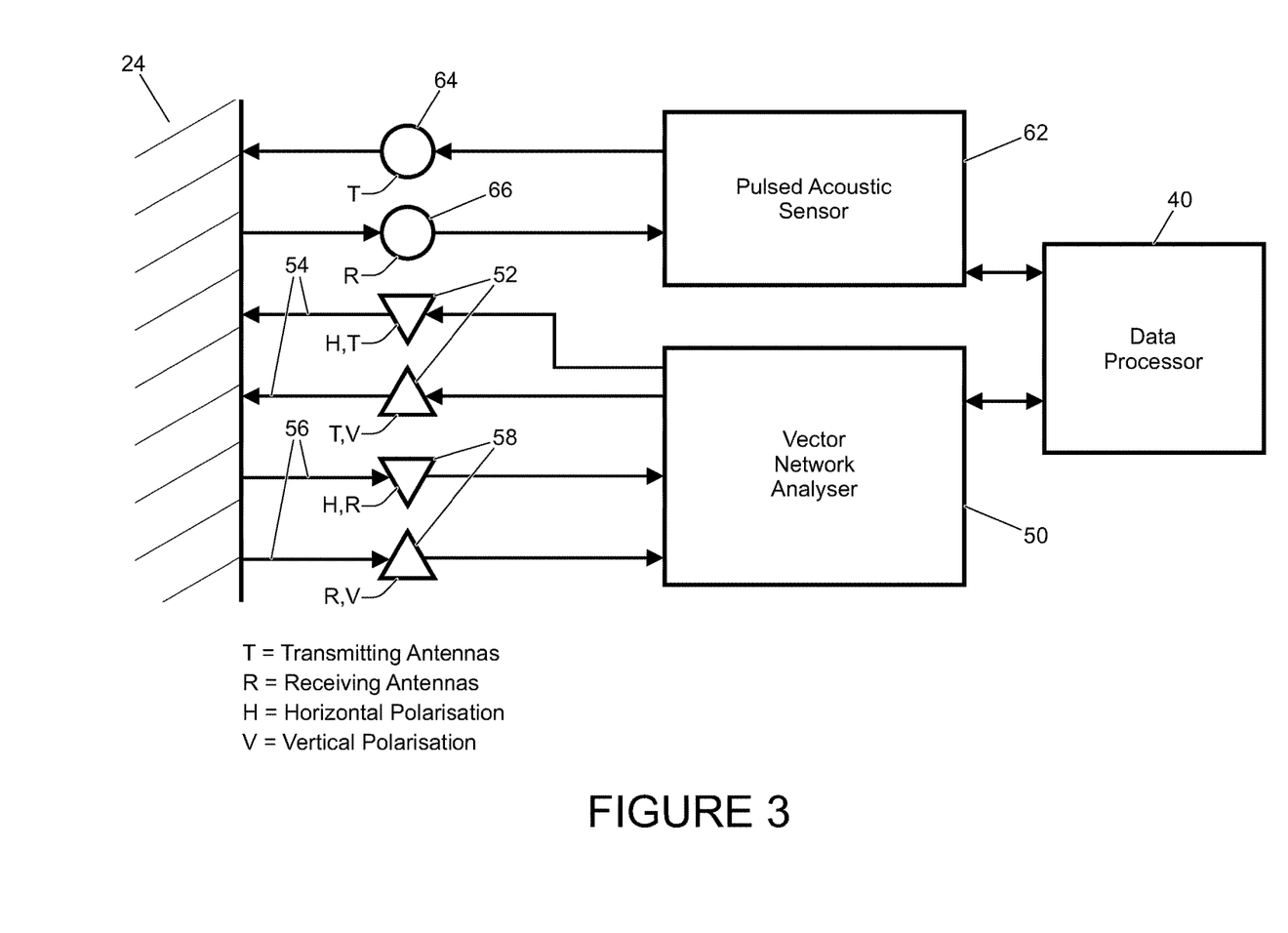
FIG. 3 is a diagram showing acoustic and radar sensors of the vehicle in FIG. 1 and means for processing output signals from those sensors.

FIG. 3 is a diagram showing acoustic and radar sensors of the vehicle 10 in FIG. 1 and the data processor 40 for processing output signals from those sensors. In this embodiment, both radar and acoustic sensors 12, 22 are used to collect sensor output data relating to the terrain ahead of the vehicle 10. Both radar and acoustic sensor output data is used because data from one type of sensor may be advantageous over the other in certain situations.

In this embodiment, the radar signals are generated by a Vector Network Analyser (VNS) 50, transmitted at orthogonal (in particular, horizontal and vertical) polarisations by a pair of transmitting antennas 52, reflected by the terrain 24 ahead of the vehicle which alters the polarisation of the transmitted signals 54, and then the backscattered signals 56 are collected by a pair of receiving antennas 58 at orthogonal polarisations. Note that a VNA 50 is used only in the experimental stage and that a dedicated hardware sensor will eventually be used. The radar sensor units may form part of the vehicle ACC system because of the similar operation and structure of the sensor units required for both purposes.

The radar sensors 22 may be used to characterise the, for example, roughness, wave absorption, or polarisation properties of a given terrain type and, in particular, may be used to detect an area of low friction caused by, for example, water, ice, or wet grass. The roughness of a given terrain type may be characterised using radar signals by analysing the backscattering properties of the wave at different polarisations. In particular, the absolute measured values include: the vertical polarisation signal power, that is the power of a received vertically polarised signal from a vertically polarised transmitter; the horizontal polarisation signal power, that is the power of a received horizontally polarised signal from a horizontally polarised transmitter; and the cross polarisation signal power, that is the power of a received horizontally polarised signal from a vertically polarised transmitter, or vice versa. The reflection of the radar signal from the terrain causes some changes to the polarisation to produce some horizontal component from a vertically polarised transmitted signal. In this way, a measure is made of the amount of the signal power of one polarisation that has had its polarisation shifted.

The transmitting antennas 52 may be further configured to generate an elliptically polarised signal. This may be achieved by transmitting the same signal with vertical polarisation and horizontal polarisation delayed in phase by a quarter wavelength. If the signals have the same power then the generated elliptically polarised signal is a circularly polarised signal, a circularly polarised signal simply being a special case of an elliptically polarised signal.

An elliptically (or circularly) polarised signal may be generated to rotate in either a clockwise or an anticlockwise direction, depending on how the transmitting antennas 52 are arranged. A transmitting antenna capable of transmitting both clockwise and anticlockwise signals will generally consist of one vertical antenna sandwiched between two horizontal antennas (or vice versa) and each separated by a quarter wavelength. In this case, a further absolute measured value may be the power of a received anticlockwise-rotating elliptically polarised signal from a clockwise-rotating elliptically polarised signal (or vice versa), and this is referred to as the cross polarisation signal power. Note from above that "cross polarisation" may refer to either a received horizontal (or vertical) signal from a transmitted vertical (or horizontal) signal or a received clockwise- (or anticlockwise-) rotating signal from a transmitted anticlockwise- (or clockwise-) rotating signal. Similarly to above, the reflection from the terrain may change the polarisation of a clockwise- (or anticlockwise-) rotating elliptically polarised signal to produce an anticlockwise- (or clockwise-) rotating component.

The radar signals 54, 56 may be transmitted and received at a plurality of different frequencies; however, for example, in the automotive industry the currently licensed bands for short-range radar are restricted to 21.65-26.65 GHz and 76-81 GHz. Note that other unlicensed frequency bands may also be considered.

The amplitude and phase of the received signals 56 are recorded by the VNS 50. These are then processed to obtain, for example, average signal powers, or reflection from a fixed area of terrain ahead of the vehicle. Relative signal powers are analysed because they are less affected by transmitter power and distance than absolute values. Relative parameters include (but are not restricted to): the ratio of the vertical polarisation signal power to the horizontal polarisation signal power; the ratio of the horizontal polarisation signal power to the vertical polarisation signal power; and the ratio of the cross polarised signal power to the horizontal polarisation signal power. Note that absolute values of signal power can be used to provide extra data; however, these values may not be as useful as relative values of signal power.

In this embodiment, the acoustic signals are sent by a pulsed acoustic sensor 62 through a transmitting antenna 64 and the backscattered signal, received through a receiving antenna 66, is measured for energy, duration, range and/or another property of the signal by the pulsed acoustic sensor 62. The data processor 40 processes the received signal to, for example; appropriately scale the signal, to account for path loss, to average the signal in time, and/or to compare against signals in different conditions (such as different weather conditions). The acoustic sensor 62 may also measure the relative backscattered signals from several range cells over the range of the transmitted signal then analyse the characteristics of the different cells. In other words, the relative backscattered signals can be gated in time to provide swathes of data to be analysed.

The acoustic sensor units form part of the vehicle parking assistance system because of the similar operation and structure of the sensor units required for both purposes. The acoustic sensor 62 may be used to characterise the, for example, roughness, texture, or sound absorption of a given terrain type. The optimum frequency in terms of cost and attenuation through the atmosphere is 40-50 kHz, and acoustic sensors on current vehicles operate at typically 51.2 kHz.

At the point of vehicle manufacture, the VCS 38 goes through a calibration process whereby calibration data obtained from offline measurements is stored on the data memory 44 of the VCS 38 for use in a real-time determination process. Once calibrated, the VCS 38 is used to determine an indication of the terrain ahead of the vehicle 10 by analysing sensor output data and comparing this with the calibration data to determine the particular terrain type. In addition, as well as the real-time determination process, a real-time training or self-learning process is implemented on the VCS 38.

Figure 4:
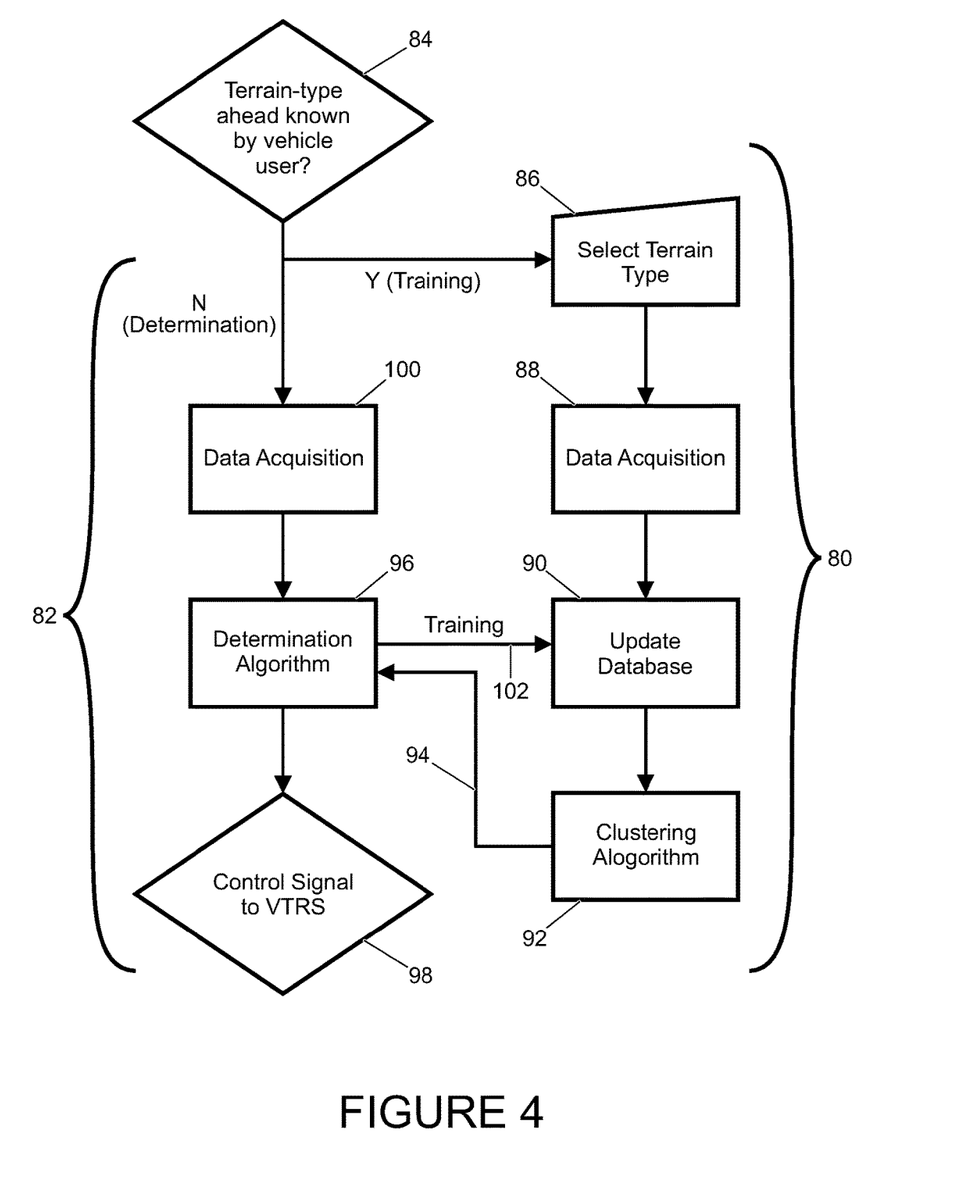
FIG. 4 is a flow diagram which illustrates a process according to an embodiment of the invention for both determining an indication of the particular terrain ahead of the vehicle in FIG. 1 when the terrain type is unknown, and training the VCS as to the characteristics of a set of parameters relating to a particular terrain type.

FIG. 4 illustrates the steps of both the training or self-learning process 80 and the determination process 82 for a calibrated system. If the terrain type ahead of the vehicle 10 can be determined by the user then the self-learning process occurs; whereas, if the terrain type ahead of the vehicle 10 cannot be determined by the user then the determination process occurs. In the latter case, the VCS 38 may be trained (or may self-learn) in conjunction with the determination process 82 to enhance subsequent situations in which terrain determination is required. Specifically, when sensor output data has been associated with a given terrain type during the determination process 82, this information may be used to update the calibration data. In this way the VCS 38 is continuously updated. It will be appreciated that the use of a user input is optional only and proving sufficient data is stored in the memory to sufficiently define the clusters, although it may be desirable to increase, over time, the accuracy of the data on which the determination is made, it is not necessary for the invention.

As a first step 84 in a self-learning process, a determination is made regarding whether the user can determine the terrain ahead. This may be implemented by a query appearing on the HMI display 36 in the form of, for example, "TERRAIN DETERMINATION?" In order to select a particular terrain type at step 86, the user may be presented with a list of possible terrain types from which a selection may be made via the HMI 36.

The self-learning process 80 collects sensor output data for a plurality of parameters for a plurality of different terrain types and uses mathematical techniques to cluster the parameters. So, for example, if the user determines a patch of ice ahead of the vehicle 10, the user inputs "ICE" to the VCS 38 via the HMI 36 at step 86. The sensor output data that has been obtained for the terrain ahead is associated with "ICE" at step 88 and the data is saved in the data memory 44 at step 90.

The data is then subjected to a clustering algorithm at step 92, as described in further detail below. The output 94 from the clustering algorithm at step 92 is input to a determination algorithm 96, which also forms a part of the determination process 82, as described below. Once these steps have been completed, a control signal 98 is provided to the VTRS 30 to adjust the vehicle system setup accordingly, in response to the terrain determination.

If there is no user-input following the query step 84, the processor by-passes the self-learning process 80 and proceeds directly to a data-acquisition step 100 which collects the sensor output data and passes this through the determination algorithm step 96. The processed sensor output data collected in step 100 is used to update the database of the data memory 44 at step 90 for a plurality of parameters for each terrain type.

The sensor output data is then passed through the clustering algorithm 92, as described below, and is returned through the determination algorithm 96. As above, where the self-learning process 80 is undertaken, the VTRS 30 is then controlled in response to the terrain determination which results from the determination algorithm 96. Since the sensor output data is passed through the clustering algorithm 92 and returned to the determination algorithm 96, the determination algorithm 96 is therefore updated, and this updated determination algorithm 96 is then used for the next real-time determination event 82. In summary, therefore, the differences in the characteristics of the collected sensor output data for different terrain types are exploited to determine an unknown terrain type ahead of the vehicle, and this collected sensor output data is used to update the VCS 38.

As an alternative, the system may make the determination without the benefit of user input of the terrain type and temporarily store the sensor output data. The system may then communicate to the user the determination of the terrain type made and ask the user, via for example the HMI, to verify that the determination was correct. If the answer is in the positive then the system may write the temporarily stored data to a data memory.

Once a cluster corresponding to a particular terrain type has a pre-determined number of data points, the system may prevent writing further data points for that particular terrain type to the data memory.

Figure 5:
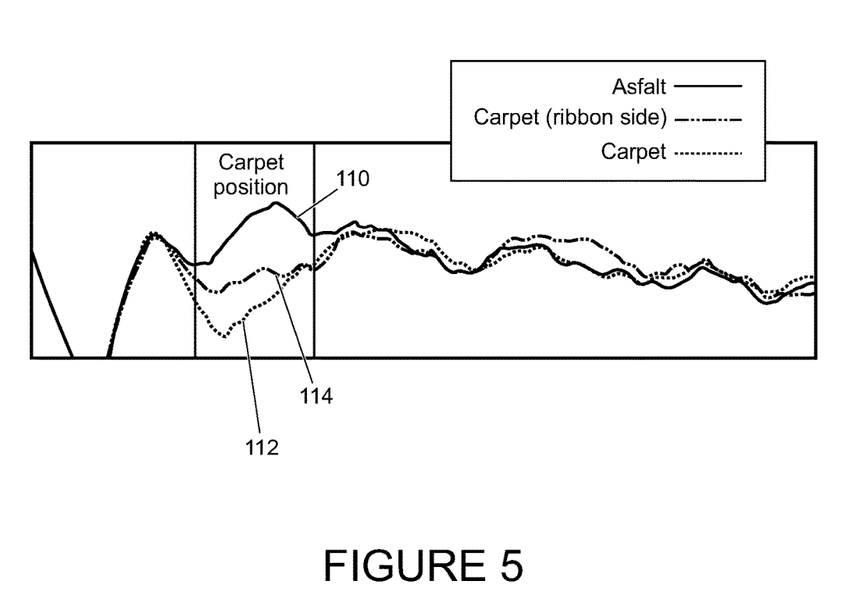
FIG. 5 shows the amplitude of a received acoustic signal from three different terrain types to illustrate the different characteristics of those terrain types.

Differences in the characteristics of the collected sensor data are shown in detail in FIG. 5 which shows the amplitude of a received acoustic signal from three different terrain types (in this case; asphalt 110, carpet 112, and the underside of carpet 114) and, in particular, shows that the received signal amplitude is different for each terrain type. Hence, the amplitude of a received acoustic signal is one example of a parameter that may be used to determine the terrain type.

Figure 6:
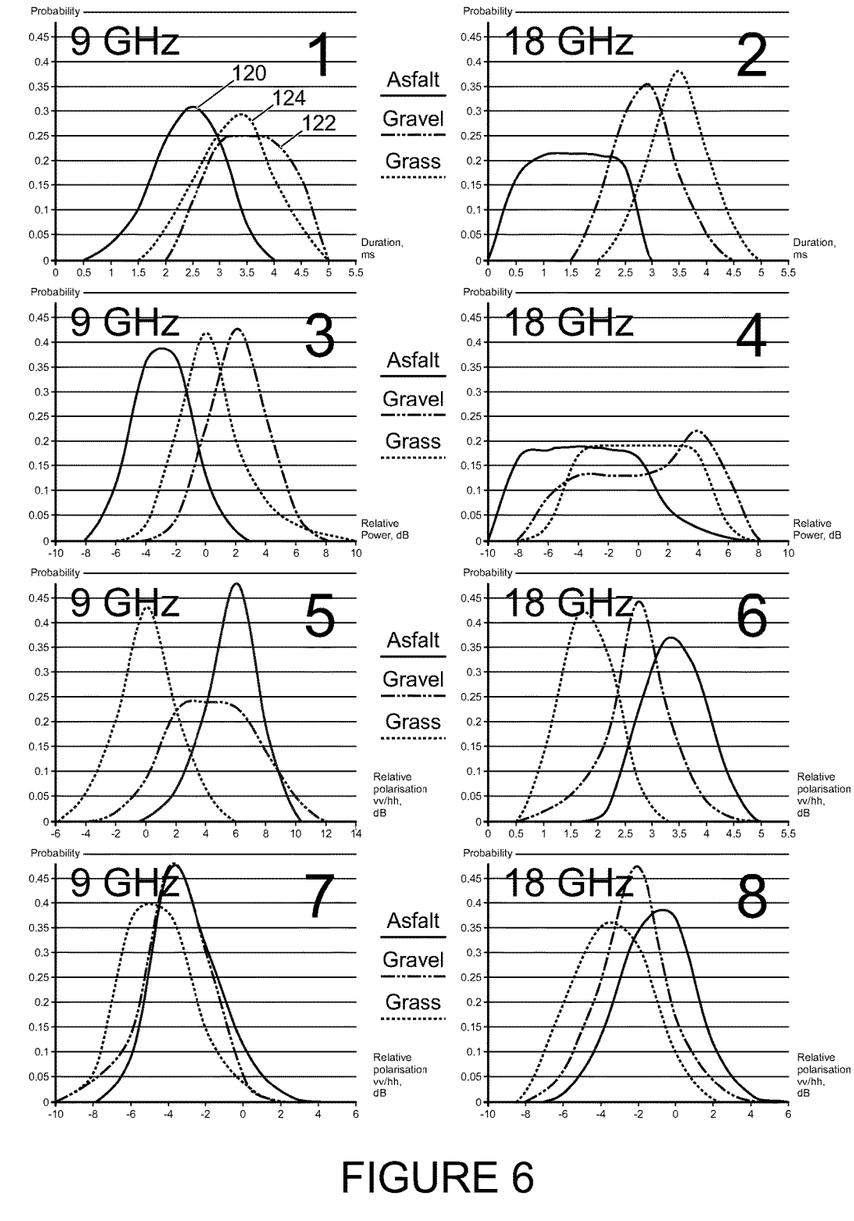
FIG. 6 shows histograms of power distribution for different parameters for two different frequencies of a received radar signal reflected from three different terrain types.

The optimal set of parameters may be regarded as those which display the greatest differences in the sensor output data between different terrain types. FIG. 6 shows histograms of power distribution for different parameters for two different frequencies of a received radar signal for three different terrain types: in this case, asphalt 120, gravel 122 and grass 124. In particular, FIGS. 6(1) and 6(2) show the backscatter signal duration, FIGS. 6(3) and 6(4) show the average relative power of a vertically polarised transmitted signal to a vertically polarised received signal, FIGS. 6(5) and 6(6) show the ratio of the vertical polarisation signal power to the horizontally polarised signal power, and FIGS. 6(7) and 6(8) show the ratio of the cross polarised signal power to the horizontally polarised signal power. In addition, FIGS. 6(1), 6(3), 6(5) and 6(7) are for a 9 GHz radar signal and FIGS. 6(2), 6(4), 6(6) and 6(8) are for an 18 GHz radar signal. The optimal parameters may then be chosen based on the independence and contrast between each curve on each plot. Note that the optimal parameters are pre-determined and stored in the data memory 44.

Figure 7:
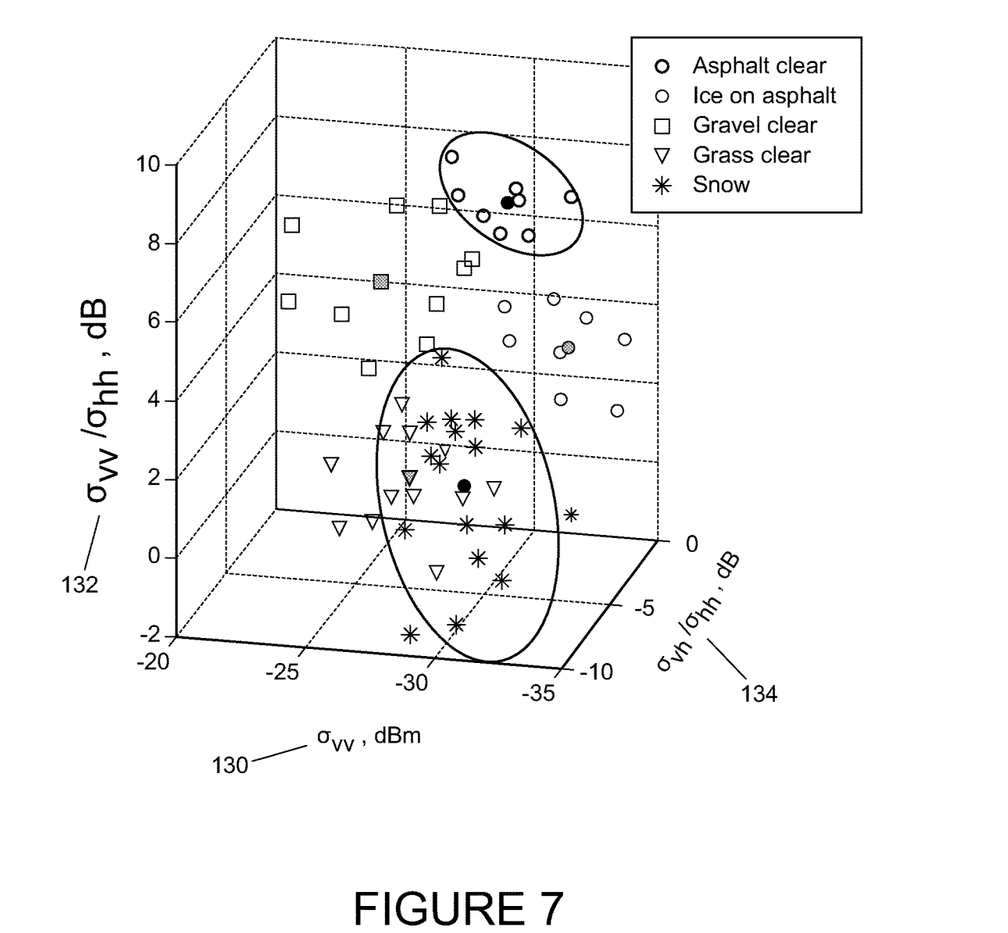
FIG. 7 shows a three-dimensional plot of parameters relating to the received radar signal in FIG. 6 reflected from five different terrain types, namely asphalt, ice on asphalt, gravel, grass and snow.
Figure 8:
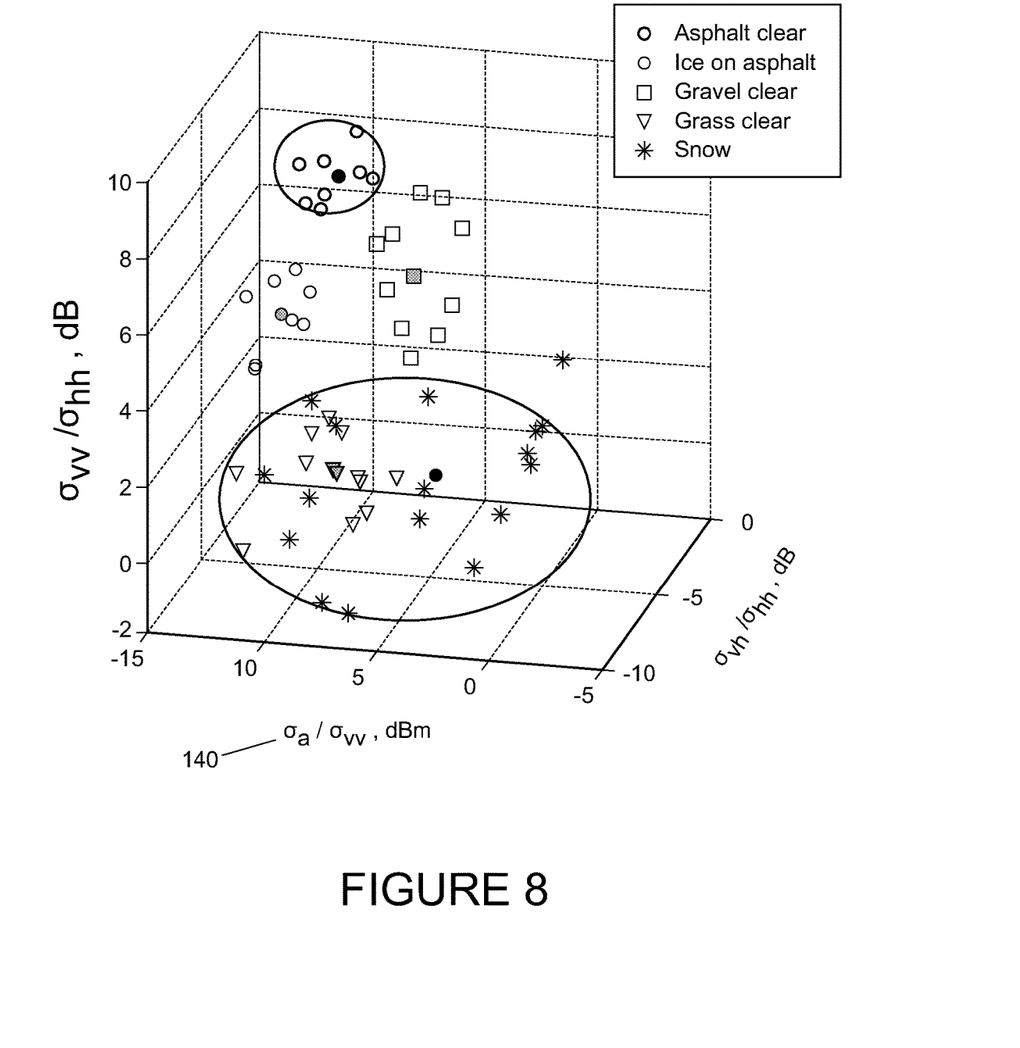
FIG. 8 shows a three-dimensional plot of parameters relating to the received radar and acoustic signals in FIG. 6 reflected from the same five terrain types as in FIG. 7.

In this embodiment, the combination of both radar and acoustic signals improves the distinction between different terrain types that are poorly distinguished by using radar signals only: this is illustrated using FIGS. 7 and 8. FIG. 7 shows a three-dimensional plot of parameters relating to the received radar signal for five different terrain types; namely, clear asphalt, ice on asphalt, clear gravel, clear grass, and snow. The three parameters plotted are the vertical polarisation radar signal power 130, the ratio of the vertical polarisation signal power to the horizontally polarised signal power 132, and the ratio of the cross polarised signal power to the horizontally polarised signal power 134.

FIG. 8 shows a similar plot to that in FIG. 7; however, in FIG. 8 parameters from both radar and acoustic received signals are plotted. In particular, rather than the vertical polarisation signal power 130 plotted in FIG. 7, the ratio of the acoustic signal power to the vertical polarisation signal power 140 is plotted in FIG. 8, and it is seen that there is greater distinction between the clusters in the case where the acoustic signal is utilised.

The clustering and determination processes applied to the sensor output data will now be described in further detail.

Referring back to step 92 in FIG. 4, a mathematical technique is used to cluster the sensor output data relating to each terrain type so as to elucidate certain characteristics associated with each terrain type.

The requirements of any mathematical technique used at step 92 are to discover clusters with complex shapes, deciding whether complex-shaped clusters are indeed more than one discrete cluster, to be able to deal with noise or outlying data points, and to be able to deal with a large number of parameters.

The well-known 'k-means' algorithm may be used to cluster sensor output data based on each data point being assigned to the cluster with the nearest mean. In this method, n data points are divided into k clusters to minimise the sum of squares in each cluster, where k may take any value less than or equal to n. In practice, the number of clusters will be pre-determined and stored in the data memory 44.

Alternatively, the well-known 'k-nearest neighbour' (k-NN) algorithm may be used to cluster sensor output data based on the sum of distances to each of a pre-determined number of neighbouring data points in each cluster. A smaller number of clusters leads to noise having a large effect on the result and a large number of clusters leads to the algorithm being computationally expensive.

The skilled reader will understand that there are many well-known cluster analysis algorithms available that could be used rather than the two mentioned above.

The determination process 82 collects sensor output data 100 for a plurality of parameters for an unknown terrain type ahead of the vehicle then uses some metric at step 96 to determine to which stored cluster the collected data point belongs (where each stored cluster corresponds to a different terrain type) and thereby determines the terrain type. As a further requirement, a control signal may be sent to the VTRS 30 at step 98 to adjust the vehicle setup accordingly.

In one embodiment, at the determination algorithm step 96 the collected parameters are used to construct a data point in k-dimensional space and the data point is assigned to a defined cluster. This may be done by calculating the Euclidean distance $$d(x, y) = \left( \sum_{i=1}^{n} (x_i - y_i)^2 \right)^{\frac{1}{2}}$$

from the collected data point to the mean point in each cluster, where the collected data point is assigned to the appropriate cluster such that the Euclidean distance is minimised, where $x=(x_1, x_2, \ldots, x_n)$ is the collected data point and $y=(y_1, y_2, \ldots, y_n)$ is the mean point of a given cluster.

Based on the particular cluster to which the collected data point is assigned, at step 98 the VCS 38 sends a control signal to the VTRS 30 with information as to the terrain type ahead of the vehicle. The VTRS 30 may then adjust the vehicle setup, as appropriate, to best negotiate the upcoming terrain.

At the determination algorithm step 96, once it has been determined to which particular cluster the collected data point belongs, the collected data point may be used to update the database 90 in the stored data memory 44 so that the clusters may be updated at step 92 continuously using real-time collected sensor output data, and the updated clusters may be used at the determination step 96 to determine to which particular cluster the next collected data point belongs, as mentioned above.

Although the previous embodiment has been described based on the use of a vector network analyser 50 and a plurality of transmitting 52, 64 and receiving 60, 66 antennas, in alternative embodiments an alternative type of network analyser or hardware arrangement of the transmitters and receivers may be used (for example, a scalar network analyser); there may be a single transmitting antenna and/or a single receiving antenna and; radar signals may be transmitted and received at a plurality of different angles of incidence to the ground.

In an alternative embodiment, some other metric may be used at the determination algorithm step 96: for example, Minkowski distance, Chebyshev distance, or Manhattan distance.

In an alternative embodiment, at step 98, rather than sending a control signal to the VTRS 30 to adjust the vehicle setup, the VCS 38 can be responsible for simply alerting a vehicle user via the HMI 36 as to the terrain type ahead of the vehicle.

In a further embodiment, output data from another type of sensor (such as an optical sensor and/or an infrared sensor) may be used in addition to output data from radar and acoustic sensors to further improve the accuracy of the system when determining the terrain type ahead of a vehicle.

It will be appreciated by a person skilled in the art that the invention could be modified to take many alternative forms without departing from the scope of the appended claims.

Further aspects of the present invention are set out in the following numbered Clauses:

Clause 1: A system for use in a vehicle determining an indication of the type of terrain ahead of the vehicle, the system comprising; a processor configured to receive sensor output data from a plurality of vehicle-mounted sensors, including at least one radar sensor and at least one acoustic sensor, each for receiving a reflected signal from the terrain ahead of the vehicle; and a data memory configured to store pre-determined data relating sensor output data for the or each acoustic sensor and the or each radar sensor to a particular terrain type; wherein the processor is configured to compare the sensor output data with the pre-determined data to determine an indication of the particular terrain type corresponding to the sensor output data.

Clause 2: A system according to Clause 1, wherein the processor is further configured to receive sensor output data from at least one optical sensor mounted on the vehicle.

Clause 3: A system according to Clause 1, wherein the processor is further configured to receive sensor output data from at least one infrared sensor mounted on the vehicle.

Clause 4: A system according to Clause 1, comprising a human machine interface configured to enable communication of the determined terrain type to the user.

Clause 5: A system according to Clause 4, wherein the human machine interface is further configured to enable user-input in relation to the terrain type following determination of the terrain type by the user.

Clause 6: A system according to Clause 5, wherein the processor is configured to receive the user-input in relation to the terrain type and, in dependence upon the user-input, to provide a terrain type to the data memory together with sensor output data corresponding to the terrain type to supplement the pre-determined data as part of a self-learning process.

Clause 7: A system according to Clause 1, wherein the processor is configured to input the determined terrain type to the data memory together with parameters corresponding to the sensor output data to supplement the pre-determined data as part of a self-learning process.

Clause 8: A system according to Clause 1, wherein the processor is configured to receive sensor output data from the or each radar sensor in the form of a received horizontally polarised signal representative of power in a received horizontal polarisation component of a radar signal reflected from the terrain ahead of the vehicle and/or to receive a vertically polarised signal representative of power in a received vertical polarisation component of a radar signal reflected from the terrain ahead of the vehicle.

Clause 9: A system according to Clause 8, wherein the processor is configured to determine one or more of: a horizontal polarisation power signal, that is the power of a received horizontally polarised signal from a horizontally polarised transmitter; a vertical polarisation power signal, that is the power of a received vertically polarised signal from a vertically polarised transmitter; and a cross polarisation power signal, that is the power of a received horizontally polarised signal from a vertically polarised transmitter or the power of a received vertically polarised signal from a horizontally polarised transmitter.

Clause 10: A system according to Clause 1, wherein the processor is configured to receive sensor output data from the or each radar sensor in the form of a received elliptically polarised signal or a received circularly polarised signal.

Clause 11: A system according to Clause 10, wherein the processor is configured to determine a cross polarisation power signal, that is the power of a received clockwise-rotating elliptically polarised signal from a transmitted anticlockwise-rotating elliptically polarised signal, or the power of a received anticlockwise-rotating elliptically polarised signal from a transmitted clockwise-rotating elliptically polarised signal.

Clause 12: A system according to Clause 9, wherein the processor is configured to determine the ratio of any two of: the horizontal polarisation power signal; the vertical polarisation power signal; and the cross polarisation power signal.

Clause 13: A system according to Clause 12, wherein the processor is configured to compare one or more of the determined ratios with a corresponding pre-determined ratio for a plurality of different terrain types, and is configured to determine an indication of the terrain type on the basis of the comparison.

Clause 14: A system according to Clause 1, wherein the processor is configured to receive sensor output data from the or each acoustic sensor in the form of an acoustic power signal representative of power in an acoustic signal reflected from the terrain ahead of the vehicle.

Clause 15: A system according to Clause 14, wherein the processor is configured to: determine a ratio of the acoustic power signal and one or more of the horizontal polarisation power signal, the vertical polarisation power signal, and the cross polarisation power signal; compare the determined ratio with a corresponding pre-determined ratio for a plurality of different terrain types; and determine an indication of the terrain type on the basis of the comparison.

Clause 16: A system according to Clause 1, wherein the processor is configured to analyse parameters relating to sensor output data and to cluster the sensor output data into a plurality of clusters, wherein each cluster corresponds to a different terrain type.

Clause 17: A system according to Clause 16, wherein the processor is configured to analyse parameters relating to the sensor output data using a 'k-means' algorithm.

Clause 18: A system according to Clause 16, wherein the processor is configured to analyse parameters relating to the sensor output data using a 'k-nearest neighbour' algorithm.

Clause 19: A system according to Clause 16, wherein the processor is configured to determine to which one of the clusters the sensor output data belongs so as to determine an indication of the terrain type.

Clause 20: A system according to Clause 19, wherein the processor is configured to determine to which one of the clusters the sensor output data belongs using a Euclidean algorithm.

Clause 21: A system according to Clause 1, further comprising at least one acoustic transmitter for transmitting an acoustic signal to the terrain ahead and at least one acoustic receiver for receiving a reflected signal of the acoustic signal from the terrain ahead, and at least one radar transmitter for transmitting a radar signal to the terrain ahead and at least one radar receiver for receiving a reflected signal of the radar signal from the terrain ahead.

Clause 22: A system according to Clause 21, wherein the radar transmitter is configured to transmit radar signals at orthogonal horizontal and vertical polarisations, and/or with a circular or elliptical polarisation.

Clause 23: A system according to Clause 21, wherein the radar transmitter is configured to transmit radar signals at two or more frequencies.

Clause 24: A system according to Clause 21, wherein the acoustic transmitter is configured to transmit a pulsed acoustic signal or a modulated acoustic signal through a transmitting antenna and the acoustic receiver is configured to receive the pulsed acoustic signal or the modulated acoustic signal.

Clause 25: A system according to Clause 1, further comprising a controller to control at least one vehicle subsystem in dependence on the determination of the terrain type.

Clause 26: A method for use in a vehicle determining an indication of the type of terrain ahead of the vehicle, the method comprising; receiving sensor output data from a plurality of vehicle-mounted sensors, including at least one radar sensor and at least one acoustic sensor, each for receiving a reflected signal from the terrain ahead of the vehicle; storing pre-determined data relating sensor output data for the or each acoustic sensor and the or each radar sensor to a particular terrain type; and comparing the sensor output data with the pre-determined data to determine an indication of the particular terrain type corresponding to the sensor output data.

Clause 27: A method according to Clause 26, further comprising receiving sensor output data from at least one optical sensor mounted on the vehicle.

Clause 28: A method according to Clause 26, further comprising receiving sensor output data from at least one infrared sensor mounted on the vehicle.

Clause 29: A method according to Clause 26, comprising enabling communication of the determined terrain type to the user.

Clause 30: A method according to Clause 29, further enabling user-input in relation to the terrain type following determination of the terrain type by the user.

Clause 31: A method according to claim 30, comprising receiving the user-input in relation to the terrain type and, in dependence upon the user-input, providing a terrain type to the data memory together with sensor output data corresponding to the terrain type to supplement the pre-determined data as part of a self-learning process.

Clause 32: A method according to Clause 26, comprising inputting the determined terrain type to the data memory together with parameters corresponding to the sensor output data to supplement the pre-determined data as part of a self-learning process.

Clause 33: A method according to Clause 32, comprising receiving sensor output data from the or each radar sensor in the form of a received horizontally polarised signal representative of power in a received horizontal polarisation component of a radar signal reflected from the terrain ahead of the vehicle and/or receiving a vertically polarised signal representative of power in a received vertical polarisation component of a radar signal reflected from the terrain ahead of the vehicle.

Clause 34: A method according to Clause 33, comprising determining one or more of: a horizontal polarisation power signal, that is the power of a received horizontally polarised signal from a horizontally polarised transmitter; a vertical polarisation power signal, that is the power of a received vertically polarised signal from a vertically polarised transmitter; and a cross polarisation power signal, that is the power of a received horizontally polarised signal from a vertically polarised transmitter or the power of a received vertically polarised signal from a horizontally polarised transmitter.

Clause 35: A method according to Clause 26, comprising receiving sensor output data from the or each radar sensor in the form of a received elliptically polarised signal or a received circularly polarised signal.

Clause 36: A method according to Clause 35, comprising determining a cross polarisation power signal, that is the power of a received clockwise-rotating elliptically polarised signal from a transmitted anticlockwise-rotating elliptically polarised signal, or the power of a received anticlockwise-rotating elliptically polarised signal from a transmitted clockwise-rotating elliptically polarised signal.

Clause 37: A method according to Clause 34, comprising determining the ratio of any two of: the horizontal polarisation power signal; the vertical polarisation power signal; and the cross polarisation power signal.

Clause 38: A method according to Clause 37, comprising comparing one or more of the determined ratios with a corresponding pre-determined ratio for a plurality of different terrain types, and determining an indication of the terrain type on the basis of the comparison.

Clause 39: A method according to Clause 26, comprising receiving sensor output data from the or each acoustic sensor in the form of an acoustic power signal representative of power in an acoustic signal reflected from the terrain ahead of the vehicle.

Clause 40: A method according to Clause 39, comprising: determining a ratio of the acoustic power signal and one or more of the horizontal polarisation power signal, the vertical polarisation power signal, and the cross polarisation power signal; comparing the determined ratio with a corresponding pre-determined ratio for a plurality of different terrain types; and determining an indication of the terrain type on the basis of the comparison.

Clause 41: A method according to Clause 26, comprising analysing parameters relating to sensor output data and clustering the sensor output data into a plurality of clusters, wherein each cluster corresponds to a different terrain type.

Clause 42: A method according to Clause 41, comprising analysing parameters relating to the sensor output data using a 'k-means' algorithm.

Clause 43: A method according to Clause 41, comprising analysing parameters relating to the sensor output data using a 'k-nearest neighbour' algorithm.

Clause 44: A method according to Clause 41, comprising determining to which one of the clusters the sensor output data belongs so as to determine an indication of the terrain type.

Clause 45: A method according to Clause 44, comprising determining to which one of the clusters the sensor output data belongs using a Euclidean algorithm.

Clause 46: A method according to Clause 26, further comprising transmitting radar signals at orthogonal horizontal and vertical polarisations, and/or with a circular or elliptical polarisation.

Clause 47: A method according to Clause 46, comprising transmitting radar signals at two or more frequencies.

Clause 48: A method according to Clause 26, further comprising controlling at least one vehicle subsystem in dependence on the determination of the terrain type.

Clause 49: A data memory containing a computer readable code for performing the method according to Clause 26.

Clause 50: A vehicle comprising a system according to Clause 1 and further comprising at least one acoustic transmitter for transmitting an acoustic signal to the terrain ahead and at least one acoustic receiver for receiving a reflected signal of the acoustic signal from the terrain ahead, and at least one radar transmitter for transmitting a radar signal to the terrain ahead and at least one radar receiver for receiving a reflected signal of the radar signal from the terrain ahead.

Clause 51: A vehicle according to Clause 50, further comprising at least one optical receiver for receiving optical images of the terrain ahead.

Clause 52: A vehicle according to Clause 50, further comprising at least one infrared transmitter for transmitting an infrared signal to the terrain ahead and at least one infrared receiver for receiving a reflected signal of the infrared signal from the terrain ahead.

The invention claimed is:

1. A system for use in a vehicle determining an indication of the type of terrain ahead of the vehicle, the system comprising:
   a processor configured to receive sensor output data from a plurality of vehicle-mounted sensors, including at least one radar sensor and at least one acoustic sensor, each for receiving a reflected signal from the terrain ahead of the vehicle;
   a human machine interface configured to enable communication of the determined terrain type to a user and to enable user-input in relation to the terrain type following determination of the terrain type by the user; and
   a data memory configured to store pre-determined data relating sensor output data for each acoustic sensor and each radar sensor to a particular terrain type,
   wherein the processor is configured to compare the sensor output data with the pre-determined data to determine an indication of the particular terrain type corresponding to the sensor output data, and further wherein the processor includes means configured to receive the user-input in relation to the terrain type and for, in dependence upon the user-input, providing a terrain type to the data memory together with sensor output data corresponding to the terrain type to supplement the predetermined data as part of a self-learning process.

2. A system according to claim 1, wherein the processor is further configured to receive sensor output data from one or more of at least one optical sensor mounted on the vehicle and at least one infrared sensor mounted on the vehicle.

3. A system according to claim 1, wherein the processor is configured to input the determined terrain type to the data memory together with parameters corresponding to the sensor output data to supplement the pre-determined data as part of the self-learning process.

4. A system according to claim 1, wherein the processor is configured to receive sensor output data from each radar sensor in the form of a horizontally polarised signal representative of power in a horizontal polarisation component of a radar signal reflected from the terrain ahead of the vehicle and/or to receive a vertically polarised signal representative of power in a vertical polarisation component of a radar signal reflected from the terrain ahead of the vehicle, wherein the processor is further configured to determine one or more of: a horizontal polarisation power signal, that is the power of a received horizontally polarised signal from a horizontally polarised transmitter; a vertical polarisation power signal, that is the power of a received vertically polarised signal from a vertically polarised transmitter; and a cross polarisation power signal, that is the power of a received horizontally polarised signal from a vertically polarised transmitter or the power of a received vertically polarised signal from a horizontally polarised transmitter, and/or wherein the processor is further configured to receive sensor output data from each radar sensor in the form of a received elliptically polarised signal or a received circularly polarised signal, wherein the processor is further configured to determine a cross polarisation power signal, that is the power of a received clockwise-rotating elliptically polarised signal from a transmitted anticlockwise-rotating elliptically polarised signal, or the power of a received anticlockwise-rotating elliptically polarised signal from a transmitted clockwise-rotating elliptically polarised signal.

5. A system according to claim 1, wherein the processor is configured to determine a ratio of any two of: the horizontal polarisation power signal; the vertical polarisation power signal; and the cross polarisation power signal, wherein the processor is further configured to compare one or more of the determined ratios with a corresponding pre-determined ratio for a plurality of different terrain types, and wherein the processor is further configured to determine an indication of the terrain type on the basis of the comparison.

6. A system according to claim 1, wherein the processor is configured to receive sensor output data from each acoustic sensor in the form of an acoustic power signal representative of power in an acoustic signal reflected from the terrain ahead of the vehicle.

7. A system according to claim 1, wherein the processor is configured to: determine a ratio of the acoustic power signal and one or more of the horizontal polarisation power signal, the vertical polarisation power signal, and the cross polarisation power signal; compare the determined ratio with a corresponding predetermined ratio for a plurality of different terrain types; and determine an indication of the terrain type on the basis of the comparison.

8. A system according to claim 1, wherein the processor is configured to analyse parameters relating to sensor output data and to cluster the sensor output data into a plurality of clusters, wherein each cluster corresponds to a different terrain type.

9. A system according to claim 8, wherein the processor is configured to analyse parameters relating to the sensor output data using one of a 'k-means' algorithm and a 'k-nearest neighbour' algorithm.

10. A system according claim 8, wherein the processor is configured to determine to which one of the clusters the sensor output data belongs so as to determine an indication of the terrain type.

11. A system according to claim 1, further comprising at least one acoustic transmitter for transmitting an acoustic signal to the terrain ahead and at least one acoustic receiver for receiving a reflected signal of the acoustic signal from the terrain ahead, and at least one radar transmitter for transmitting a radar signal to the terrain ahead and at least one radar receiver for receiving a reflected signal of the radar signal from the terrain ahead.

12. A system according to claim 11, wherein the radar transmitter is configured to transmit radar signals at orthogonal horizontal and vertical polarisations, and/or with a circular or elliptical polarisation and/or at two or more frequencies, and/or wherein the acoustic transmitter is configured to transmit a pulsed acoustic signal or a modulated acoustic signal through a transmitting antenna and the acoustic receiver is configured to receive the pulsed acoustic signal or the modulated acoustic signal.

13. A system according to claim 1, further comprising means configured to control at least one vehicle subsystem in dependence on the determination of the terrain type.

14. A method for use in a vehicle determining an indication of the type of terrain ahead of the vehicle, the method comprising:
receiving sensor output data from a plurality of vehicle-mounted sensors, including at least one radar sensor and at least one acoustic sensor, each for receiving a reflected signal from the terrain ahead of the vehicle;
storing pre-determined data relating sensor output data, for the or each acoustic sensor and the or each radar sensor, to a particular terrain type;
comparing the sensor output data with the pre-determined data to determine an indication of the particular terrain type corresponding to the sensor output data; and
receiving, via a human machine interface configured to enable communication of the determined terrain type to the user and to enable user-input in relation to the terrain type following determination of the terrain type by the user, the user-input in relation to the terrain type and, in dependence upon the user-input, providing a terrain type to the data memory together with sensor output data corresponding to the terrain type to supplement the pre-determined data as part of a self-learning process.

15. A method according to claim 14, comprising receiving sensor output data from the or each radar sensor in the form of a received horizontally polarised signal representative of power in a received horizontal polarisation component of a radar signal reflected from the terrain ahead of the vehicle and/or receiving a vertically polarised signal representative of power in a received vertical polarisation component of a radar signal reflected from the terrain ahead of the vehicle.

16. A method according to claim 15, comprising determining one or more of: a horizontal polarisation power signal, that is the power of a received horizontally polarised signal from a horizontally polarised transmitter; a vertical polarisation power signal, that is the power of a received vertically polarised signal from a vertically polarised transmitter; and a cross polarisation power signal, that is the power of a received horizontally polarised signal from a vertically polarised transmitter or the power of a received vertically polarised signal from a horizontally polarised transmitter.

17. A method according to claim 14, comprising receiving sensor output data from each radar sensor in the form of a received elliptically polarised signal or a received circularly polarised signal and determining a cross polarisation power signal, that is the power of a received clockwise-rotating elliptically polarised signal from a transmitted anticlockwise-rotating elliptically polarised signal, or the power of a received anticlockwise-rotating elliptically polarised signal from a transmitted clockwise-rotating elliptically polarised signal.

18. A method according to claim 14, comprising analysing parameters relating to sensor output data and clustering the sensor output data into a plurality of clusters, wherein each cluster corresponds to a different terrain type.

19. A vehicle controller for determining an indication of the type of terrain ahead of the vehicle, the controller comprising;

a processor having an input to receive sensor output data from a plurality of vehicle-mounted sensors, including at least one radar sensor and at least one acoustic sensor, each vehicle-mounted sensor for receiving a reflected signal from the terrain ahead of the vehicle; and memory having stored thereon pre-determined data relating sensor output data for the or each acoustic sensor and the or each radar sensor to a particular terrain type, wherein the processor compares the sensor output data with the stored pre-determined data to determine an indication of the particular terrain type corresponding to the sensor output data and receives, via a human machine interface configured to enable communication of the determined terrain type to the user and to enable user-input in relation to the terrain type following determination of the terrain type by the user, the user-input in relation to the terrain type and, in dependence upon the user-input, providing a terrain type to the data memory together with sensor output data corresponding to the terrain type to supplement the pre-determined data as part of a self-learning process.

20. A system for use in a vehicle, the system comprising:

a processor configured to receive sensor output data from a plurality of vehicle-mounted sensors, including at least one radar sensor and at least one acoustic sensor, each for receiving a reflected signal from the terrain ahead of the vehicle;

a human machine interface configured to enable communication of the determined terrain type to a user and to enable user-input in relation to the terrain type following determination of the terrain type by the user;

a data memory configured to store pre-determined data relating sensor output data for each acoustic sensor and each radar sensor to a particular terrain type,
wherein the processor is configured to compare the sensor output data with the pre-determined data to determine an indication of the particular terrain type corresponding to the sensor output data, and further wherein the processor includes means configured to receive the user-input in relation to the terrain type and for, in dependence upon the user-input, providing a terrain type to the data memory together with sensor output data corresponding to the terrain type to supplement the predetermined data as part of a self-learning process;

at least one acoustic transmitter for transmitting an acoustic signal to the terrain ahead; and at least one acoustic receiver for receiving a reflected signal of the acoustic signal from the terrain ahead, and at least one radar transmitter for transmitting a radar signal to the terrain ahead and at least one radar receiver for receiving a reflected signal of the radar signal from the terrain ahead.

* * * * *